United States Patent [19]

Okawa et al.

[11] Patent Number: 5,376,601
[45] Date of Patent: Dec. 27, 1994

[54] SINTERED PRODUCT OF ALUMINUM NITRIDE, A PROCESS FOR THE PREPARATION THEREOF, AND A BAKING JIG USING THE SAME

[75] Inventors: Yoshihiro Okawa; Kenichiro Miyahara, both of Kokubu, Japan

[73] Assignee: Kyocera Corporation, Kyoto, Japan

[21] Appl. No.: 116,812

[22] Filed: Sep. 7, 1993

Related U.S. Application Data

[63] Continuation of Ser. No. 891,238, May 29, 1992, abandoned.

[30] Foreign Application Priority Data

May 30, 1991 [JP] Japan .................. 3-127208
Sep. 4, 1991 [JP] Japan .................. 3-224037
Apr. 27, 1992 [JP] Japan .................. 4-107101

[51] Int. Cl.$^5$ ............................................. C04B 35/58
[52] U.S. Cl. .................................................. 501/98
[58] Field of Search ................................. 501/96, 98

[56] References Cited

U.S. PATENT DOCUMENTS

| | | | |
|---|---|---|---|
| 4,847,221 | 7/1989 | Horiguchi et al. | 501/98 |
| 4,908,173 | 3/1990 | Schwetz et al. | 501/98 X |
| 4,983,462 | 1/1991 | Hiai et al. | 501/98 X |
| 5,219,803 | 6/1993 | Yamakawa et al. | 501/98 X |
| 5,264,388 | 11/1993 | Yamakawa et al. | 501/98 X |

*Primary Examiner*—Karl Group
*Attorney, Agent, or Firm*—Spensley Horn Jubas & Lubitz

[57] ABSTRACT

A molded article is prepared from an AlN powder of a high purity without adding sintering assistant, baked in a nitrogen atmosphere without containing carbon, and is further heat-treated in a nitrogen atmosphere containing carbon in order to remove impurities in the sintered product. There is obtained a highly pure and dense sintered product which comprises mainly a phase of aluminum nitride, which has an average grain size of greater than 9 $\mu$m, cationic metal impurities other aluminum, and Si, Fe and Ca in amounts smaller than predetermined values. The sintered product exhibits a very small creep rate when stress is applied thereto at high temperatures and is used as a material for high temperature uses such as a baking jig. Owing to its excellent anti-creeping property at high temperatures, tile product is suitably used as a structural material subject to stress at high temperatures for extended periods of time. When used as a baking jig, in particular, the sintered product does not adversely affect the molded articles and exhibits excellent durability.

4 Claims, 2 Drawing Sheets

FIG. 3

SINTERED PRODUCT OF ALUMINUM NITRIDE, A PROCESS FOR THE PREPARATION THEREOF, AND A BAKING JIG USING THE SAME

This is a continuation of application Ser. No. 07/891,238 filed on May 29, 1992, now abandoned.

BACKGROUND OF THE INVENTION

1. Field of the Invention

The present invention relates to a sintered product of aluminum nitride having excellent durability at high temperatures, a process for the preparation thereof, and a baking jig such as a setter using the same.

2. Description of Prior Art

In recent years, integrated circuits such as ICs and LSIs have been fabricated in a highly density integrated form to produce large outputs accompanied, however, by the occurrence of a problem in regard to radiation of heat of silicon semiconductor elements. Under such circumstances, attempts have been made to develop a sintered product of aluminum nitride (hereinafter referred to as AlN) from a conventional insulating substrate of alumina sintered product maintaining a high thermal conductivity, a large electric insulating property and excellent matching with silicon in terms of coefficient of thermal expansion. Moreover, AlN has further been known as non-oxidizing ceramics having excellent strength at high temperatures in addition to SiC and $Si_3N_4$.

Such an AlN sintered product is usually obtained by adding a sintering assistant composed of an oxide of the Group 3a of periodic table such as $Y_2O_3$ or an oxide of the Group 2a of periodic table such as CaO to the starting powder of AlN, followed by molding, and then baking the molded article in a nitrogen-containing atmosphere at a temperature of 1600° to 2000° C.

In baking non-oxidizing ceramics such as AlN, etc., furthermore, it has been demanded to provide a material that exhibits excellent heat resistance at high temperatures and that can be used as a baking jig such as a setter for holding the molded article during the baking, such that the sintered product will not undergo deformation such as warping or will not be stained. AlN sintered product and BN sintered product of high purity that can be used as baking jigs have been concretely described in Japanese Laid-Open Patent Publications Nos. 197367/1989, 70269/1987 and 233081/1988.

In fact, however, most of the heat resistant non-oxidizing ceramic sintered products do not contain sintering assistant from the standpoint of decreasing the effect to the molded article. Therefore, the sintered product itself has a low density and develops deformation when it is subjected to a temperature in excess of 1500° C. for long periods of time, and is not suited for use as a baking jig that will be used repetitively.

Moreover, the AlN sintered product that will be used for a variety of electronic parts and semiconductor parts must not be warped or deformed, must not be stained when it is machined into a substrate, and must not be coasened on the surfaces thereof. However, the use of a conventional AlN sintered product of even a high purity is not enough for completely preventing the deformation, stains and coarsening on the surfaces, and the yield of product is not maintained.

SUMMARY OF THE INVENTION

The object of the present invention therefore is to provide an AlN sintered product which has durability at high temperatures and which exhibits a creep rate of smaller than $2 \times 10^{-8}$/sec when stress is applied thereto at high temperatures, to provide a process for preparing the AlN sintered product having a high purity and a high density, and to provide a baking jig which prevents the molded article from being deformed or stained and which does not permit the properties of the obtained sintered product to be deteriorated.

The present inventors have forwarded the study in order to solve the above-mentioned problems, and have discovered that when used as a baking jig, the AlN sintered product of the invention exhibits excellent resistance if the amounts of impurities such as cationic metals, carbon and oxygen are controlled and further exhibits excellent properties without deformation, stain or coarsening on the surfaces.

That is, the AlN sintered product of the present invention substantially comprises a single phase of aluminum nitride, having an average grain size of greater than 9 μm, containing cationic metal impurities other than aluminum in a total amount smaller than 0.3% by weight, Si in an amount smaller than 1000 ppm, Fe in an amount smaller than 150 ppm, Ca in an amount smaller than 200 ppm, carbon in an amount smaller than 0.3% by weight and having a relative density of greater than 90%, wherein when a transverse test piece prepared therefrom in compliance with JIS R1601 is subjected to the application of stress under the conditions of 1823 K and 10 kg/mm$^2$, a creep rate of smaller than $2 \times 10^{-8}$/sec is exhibited.

Moreover, the invention deals with a process for preparing sintered products wherein an aluminum nitride powder having Si in an amount smaller than 1000 ppm, Fe in an amount smaller than 150 ppm and Ca in an amount smaller than 200 ppm as cationic impurities other than aluminum, is molded without adding sintering assistant, and is baked at a temperature higher than 1850° C. in a non-oxidizing atmosphere without substantially containing carbon to obtain a sintered product having a relative density of greater than 90%, further followed by the heat-treatment at a temperature of 1850° to 2200° C. in a non-oxidizing atmosphere containing carbon.

DETAILED DESCRIPTION OF PREFERRED EMBODIMENTS

It is essential that the AlN sintered product of the present invention substantially comprises a single phase of AlN and is highly dense having a relative density of greater than 90% and, particularly, greater than 95%. It has heretofore been attempted to add a variety of metal oxides in order to improve sintering property. However, the components of sintering assistant remain on the grain boundary of AlN crystal grains of the sintered product. A method has been proposed to diffuse the sintering assistant after it has been added and baked, which, however, is not capable of completely removing the sintering assistant.

If there exists a grain boundary phase consisting of metal oxides in the sintered product, the grain boundary phase is softened at high temperatures and crystal grains develop slipping, and the sintered product is easily deformed if stress is applied thereto at high temperatures and exhibit a great creep rate. In addition, if there exists a grain boundary phase composed of metal oxides in the sintered product, grain boundary components ooze out during the baking when the sintered product is used as a setter for baking, for example, ceramics. The grain boundary components then diffuse into the molded article; i.e., stains develop on the molded article which is in contact with the setter.

When the relative density is smaller than 90%, furthermore, the sintered product has such a small strength that it is easily deformed when it is subjected to high temperatures. Moreover, when the sintered product is used as a jig for baking ceramic molded articles that contain sintering assistants, the sintering assistants contained in the molded articles migrate into the baking jig; i.e., the baking jig is contaminated and adversely affects other molded articles when it is used repetitively. Moreover, the surfaces of the jig itself become coarsened, and the surfaces of the obtained sintered product are coarsened, too.

Figure 1:
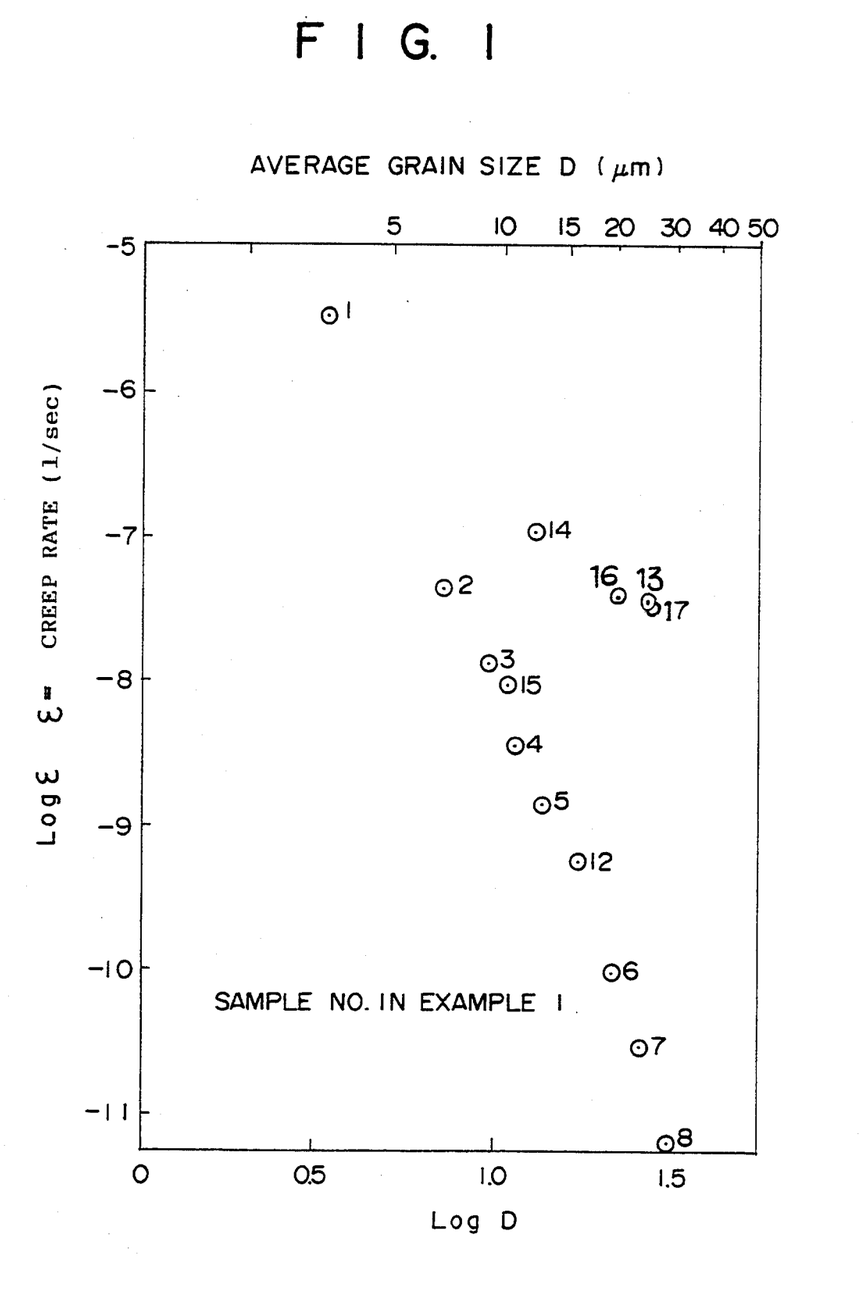
FIG. 1 is a diagram illustrating a relationship between logarithmic values (log D) of average grain sizes (D) of sintered products of aluminum nitride and logarithmic values (log ε) of creep rates S.
Figure 2:
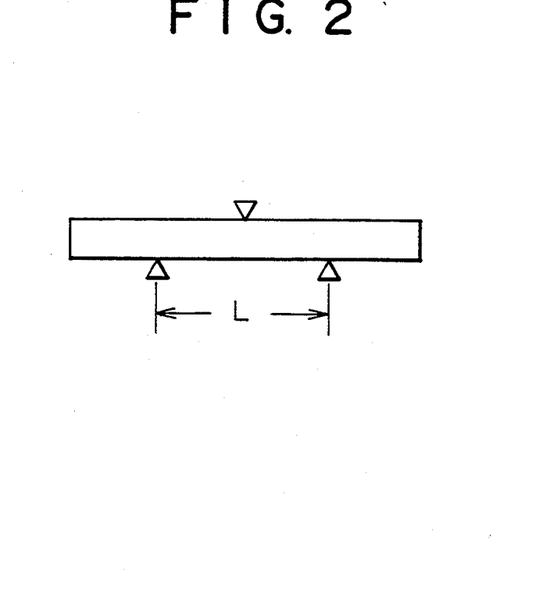
FIG. 2 is a diagram explaining the method of measuring the creep rate according to the present invention.

According to the present invention, furthermore, it is essential that the AlN grains have an average grain size which is greater than 9 μm. FIG. 1 shows a relationship between logarithmic values (log D) of average grain sizes (D) of AlN grains and logarithmic values (log $\epsilon$) of creep rates ($\epsilon$) of when transverse test pieces in compliance with JIS R1601 are subjected to the application of stress under the conditions of 1823 K and 10 kg/mm$^2$. As shown in FIG. 1, there exists a correlation between the average grain size of AlN and the creep rate at high temperatures, and the creeping rate tends to become smaller with an increase in the average grain size of AlN. Therefore, when the average grain size is smaller than 9 μm, the sintered product exhibits an increased creep rate when stress is applied thereto at high temperatures and is greatly deformed at high temperatures. In particular, it is desired that the average grain size of AlN is greater than 11 μm. According to the present invention, it is desired that the number of grains having diameters over a range of 0.3D to 1.8D with respect to the average grain size D of AlN is greater than 50% in the whole AlN sintered product.

Even when the average grain size of AlN is greater than 9 μm, however, the creeping property is greatly deteriorated if cationic impurities such as Si and Fe other than Al are present in large amounts in the sintered product. Concretely speaking, it is important that the amount of cationic metal impurities other than Al is smaller than 0.3% by weight and, particularly, smaller than 0.2% by weight, the amount of Si is smaller than 1000 ppm and, particularly, smaller than 600 ppm, and the amount of Fe is smaller than 150 ppm and, particularly, smaller than 100 ppm. If these metal impurity components exceed the above-mentioned ranges, the creep rate becomes greater than $2 \times 10^{-8}$/sec. Moreover, when the sintered product is used as a baking jig, the impurities chemically react with the molded article and the obtained sintered product develops stains or is warped and, furthermore, the baking jig and the molded article are seized up.

According to the present invention, it is desired that the AlN sintered product contains carbon in an amount of smaller than 0.3% by weight from the standpoint of using it as a baking jig. This is because if carbon is contained in large amounts in the jig, the surfaces of the jig are gradually coarsened after repeated number of times of baking. Moreover, carbon reacts with the AlN molded article during the baking, and the resulting AlN sintered product develops stains and exhibits large dielectric loss (tan $\delta$) causing electric properties to become defective. Furthermore, the baking jig and the obtained AlN sintered product are seized up, or the jigs are seized up. It is therefore particularly desired that the amount of carbon is smaller than 0.15% by weight.

According to the present invention, furthermore, it is desired that the amount of oxygen in the AlN sintered product is smaller than 5% by weight. This is because if oxygen is contained in large amounts in the baking jig, oxygen diffuses into the AlN molded article causing the obtained sintered product to develop stains or the heat conductivity to decrease. Moreover, the baking jig is easily deformed and must be corrected. In particular, it is desired that the amount of oxygen is smaller than 3% by weight.

Described below is a process for preparing sintered products of aluminum nitride according to the present invention.

According to the process of the present invention, a molded product is baked without substantially adding oxides of elements of the Group 2a of periodic table such as CaO or oxides of elements of the Group 3a of periodic table such as Y$_2$O$_3$ that had heretofore been added as sintering assistants. Attempts have heretofore been made to add a highly volatile assistant as a sintering assistant and to remove it by diffusion after baking in order to obtain a sintered product of aluminum nitride of a high purity. Even with this method, however, the components of sintering assistant cannot be completely removed, and the remaining assistant gives adverse effects. According to the present invention, therefore, what makes a great feature is that the baking is carried out without at all adding such a sintering assistant.

In order to increase the density without adding assistant, therefore, it is important to use a starting powder of aluminum nitride having an average grain size of smaller than 3 μm and, particularly, smaller than 2.5 μm, and containing impurity oxygen in an amount smaller than 3% by weight and, particularly, in an amount of 0.3 to 2.5% by weight. That is, a high density is not accomplished if the average grain size is greater than 3 μm or if the amount of impurity oxygen is greater than 3% by weight, or the high density is not accomplished, either, depending upon the grain size of the starting materials if the amount of impurity oxygen is smaller than 0.3% by weight.

In order to obtain a sintered product having the aforementioned excellent high-temperature properties according to the present invention, furthermore, it is necessary that the starting powder of aluminum nitride has cationic impurities in a total amount smaller than 0.3% by weight, and contains Si in an amount smaller than 1000 ppm, Fe in an amount smaller than 150 ppm, and Ca in an amount smaller than 200 ppm. This is because the high-temperature properties and the creeping properties are deteriorated if the amounts of cationic impurities and the amounts of Si, Fe and Ca are greater than the aforementioned amounts.

Next, a molded article is prepared by using the above starting powder of aluminum nitride. In preparing the molded article, a desired organic binder is added in order to improve, for example, moldability, a slurry is prepared by mixing the ingredients using a ball mill, the slurry is spray-dried to obtain a granular powder, and the granules are introduced into the mold to pressmold them into an AlN molded article. In this case, the organic binder should be the one that does not leave carbon when the binder is decomposed. The molded article can be prepared by a widely known molding method such as extrusion molding method, injection molding method, sheet molding method such as of doctor blade, or cold hydrostatic pressure molding method in addition to press molding.

According to the present invention, the molded article obtained as described above is dewaxed in an oxidizing or non-oxidizing atmosphere or in vacuum at a predetermined temperature, and is baked at a temperature of higher than 1850° C. in a non-oxidizing atmosphere without substantially containing carbon in order to obtain a dense sintered product having a relative density of greater than about 90%. This is a step necessary for achieving a high density. If carbon is contained in the atmosphere at the time of sintering or if the baking temperature is lower than 1850° C., the sintering dies not almost proceed and a dense sintered product is not obtained. The atmosphere without containing carbon is obtained by using a baking furnace made of a high-melting material such as tungsten or molybdenum. Or, when a carbon furnace is used, the molded article should be baked being contained in a pot such as of W, AlN or BN in a manner that carbon does not infiltrate into the pot.

In order to increase the density, in general, the molded article is baked under the application of pressure. In the case of the hot-press method in which the molding material made of carbon is employed, however, the atmosphere contains carbon which makes it difficult to increase the density. The present invention, therefore, favorably employs the normal-pressure baking method or the baking method pressurized with a nitrogen gas. If the baking temperature exceeds 2100° C., the aluminum nitride itself decomposes and vaporizes and the surfaces are coarsened.

Next, the sintered product obtained as described above is heat-treated at 1850° to 2200° C. in an atmosphere containing carbon. This is a step necessary for removing impurities contained in the sintered product and for growing aluminum nitride crystals. When there exists no carbon in the atmosphere or when the temperature of heat treatment is lower than 1850° C., it becomes difficult to remove impurities in the sintered product or the particles do not grow sufficiently making it difficult to control the amounts of cationic metal impurities to be smaller than 0.3% by weight, the amount of Si to be smaller than 1000 ppm, the amount of Ca to be smaller than 200 ppm and the amount of Fe to be smaller than 150 ppm and, further, making it difficult to control the average grain size of aluminum nitride crystal grains to be greater than 9 $\mu$m.

The thus obtained sintered product of aluminum nitride is a polycrystalline product comprising mainly a phase of aluminum nitride crystals, desirably a substantially single phase of aluminum nitride and exhibits high-temperature properties and, particularly, excellent deformation resistance under the condition where stress is applied thereto at high temperatures, and can be used as a variety of materials for high-temperature applications and can particularly favorably be used as a jig for dewax step, sintering step and heat-treatment step of non-oxidizing ceramics.

Among the non-oxidizing ceramics, aluminum nitride is drawing attention as a substrate material for electronic parts and semiconductors featuring high insulating property and high heat conductivity. Here, however, attention must be given sufficiently to the substrate in regard to its deformation and stains.

Concretely described below is the case where the sintered product of the present invention is used as a baking jig for preparing a substrate of aluminum nitride. The aluminum nitride molded article that is to be baked usually comprises a starting powder of aluminum nitride as a main component, and contains compounds of elements of the Group 2a of periodic table such as CaO, or compounds of elements of the Group 3a of periodic table such as $Y_2O_3$ in an amount of 0.5 to 20% by weight as sintering assistants, and contains, in addition to them, metal compounds of the Groups 4a, 5a, 6a, 7a and 8a of periodic table. Such a molded article is obtained by molding the above mixture powder into the shape of a substrate by the press molding or doctor blade method.

Figure 3:
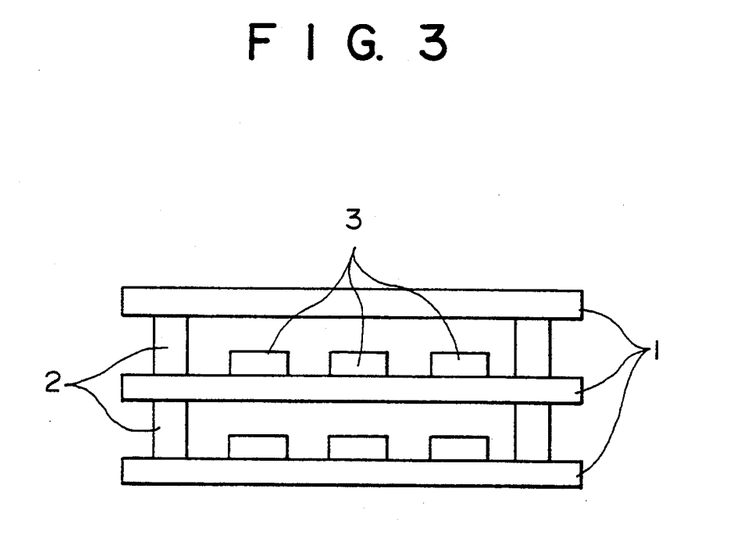
FIG. 3 is a diagram of when a sintered product of aluminum nitride is used as a baking jig according to an embodiment of the present invention.

Next, as shown in FIG. 3, molded articles of substrates 3 are arranged on setter 1 which are composed of the sintered product of aluminum nitride of the present invention, and are stacked in several using support members 2 which are also made by the material of this invention, and are baked in a baking furnace. The baking is carried out under the conditions in which the molded articles of substrates become sufficiently dense. Concretely, the baking is carried out at 1600° to 2000° C. in a non-oxidizing atmosphere containing nitrogen for 10 minutes to 100 hours.

The setters and support members of the present invention have excellent high-temperature properties and are not deformed under the baking conditions and, hence, do not cause the molded articles of substrates to be deformed. In addition, the setters and support members have a high purity and do not cause the molded articles of substrates to develop stains or do not cause the surfaces of the sintered substrates to be coarsened. The setters and support members are not almost deformed at high temperatures and can be repetitively used semi-permanently.

The sintered product of aluminum nitride of the present invention can be used as a crucible for producing compound semiconductors, as an electrically insulating material for high temperature furnaces, as a material for high temperature furnaces, and as a variety of materials for high temperature applications in addition to the baking jig mentioned above.

According to the present invention, the sintered product of aluminum nitride comprises a main phase of aluminum nitride crystals without substantially grain boundaries, the grain size are greater than 9 $\mu$m, and the amounts of Si, Fe and Ca which are impurities are controlled to be smaller than predetermined values. Therefore, the crystals do not undergo slipping at high temperatures and do not develop deformation, and the sintered product as a whole is not deformed or warped.

The sintered product of aluminum nitride exhibits anti-creeping property, i.e., exhibits a creep rate of as very small as $2 \times 10^{-8}$/sec or less when stress is applied thereto under the conditions of 1823 K and 10 kg/mm$^2$.

Furthermore, the sintered product comprises a single phase of aluminum nitride of a high purity, and reacts very little with other substances at high temperatures and does not give adverse effect.

Therefore, the sintered product of aluminum nitride can be used as a variety of machinery parts and jigs or tools for high temperature applications that require durability and dimensional precision under high temperature conditions.

When the sintered product is used, for example, as a baking jig for producing AlN substrates, the relative density of the baking jig which has been increased to be greater than 90% prevents the sintering assistant in the AlN molded substrate from migrating into the baking jig during the baking, and the surfaces of the obtained substrates are not coarsened. Moreover, since the jig contains cationic metal impurities in small amounts except aluminum, chemical reaction takes place very little between the AlN substrates and the baking jig. Therefore, the obtained AlN substrates do not develop stains, and the baking jig and the AlN substrates are not seized up, either.

Moreover, since the amount of carbon is controlled to be smaller than 0.3% by weight, surfaces of the baking jig are not coarsened even after it is used an increased number of times, and the reaction due to carbon not almost take place between the AlN molded substrate and the jig.

Since the amount of oxygen in the jig is controlled to be smaller than 5% by weight, oxygen does not diffuse into the AlN molded substrate to decrease its heat conductivity.

It is therefore possible to almost reliably prevent the baking jigs from being deformed, cracked, or losing purity of from being seized up; i.e., the baking jigs and the AlN molded substrates are not seized up, properties of the AlN substrates are not deteriorated by the reaction, AlN substrates are not stained, warped, or do not lose heat conductivity, or do not lose electric properties.

EXAMPLES

Example 1

Starting materials A to H shown in Table 1 were used as starting powders of aluminum nitride and an organic binder was added thereto. These mixtures were sufficiently mixed together in a ball mill using methanol as a solvent. The obtained slurries were dry-granulated by spray-drying, and the resulting granules were press-molded with a pressure of 0.5 ton/cm$^2$ to prepare molded articles having a shape measuring 160 mm ×157 mm ×9.5 mm (thickness). The molded articles were baked and heat-treated under the conditions shown in Tables 2 and 3, wherein samples Nos. 12 to 17 are those obtained by adding Si or Fe in amounts as shown to the starting material A.

TABLE 1

| Starting Material | Average Particle size (μm) | Amount of Oxigen (wt %) | Amount of Carbon (wt %) | Amounts of Cationic Impuritis (ppm) | | | |
|---|---|---|---|---|---|---|---|
| | | | | Si | Fe | Ca | Total |
| A | 1.54 | 0.90 | 0.03 | 700 | 80 | 230 | 1328 |
| B | 2.50 | 0.79 | 0.03 | 61 | 11 | 370 | 541 |
| C | 2.80 | 1.15 | 0.05 | 70 | 49 | 83 | 254 |
| D | 1.68 | 1.06 | 0.24 | 120 | 149 | 50 | 387 |
| E | 1.19 | 1.55 | 0.03 | 30 | 30 | 190 | 324 |
| F | 3.28 | 1.20 | 0.13 | 290 | 290 | 56 | 946 |
| G | 1.48 | 1.69 | 0.04 | 550 | 1800 | 69 | 3953 |
| H | 1.79 | 3.41 | 0.03 | 97 | 118 | 42 | 372 |

TABLE 2

| Sample No. | AlN starting material (ppm) | | Primary baking | | | | Secondary baking | | | |
|---|---|---|---|---|---|---|---|---|---|---|
| | Si amount | Fe amount | Setting method | Temp. (°C.) | Time (hr) | Atmosphere | Setting method | Temp. (°C.) | Time (hr) | Atmosphere |
| *1 | | A | in a W pot | 1950 | 2 | N$_2$ | — | — | — | — |
| *2 | | A | in an AlN pot | 2050 | 24 | N$_2$ | — | — | — | — |
| 3 | | A | in a W pot | 1950 | 2 | N$_2$ | C furnace oven | 1950 | 1 | N$_2$ |
| 4 | | A | in a W pot | 1950 | 2 | N$_2$ | C furnace oven | 1950 | 4 | N$_2$ |
| 5 | | A | in a W pot | 1950 | 2 | N$_2$ | C furnace oven | 2000 | 8 | N$_2$ |
| 6 | | A | in a W pot | 1950 | 2 | N$_2$ | C furnace oven | 1950 | 12 | N$_2$ |
| 7 | | A | in a W pot | 1950 | 2 | N$_2$ | C furnace oven | 2050 | 24 | N$_2$ |
| 8 | | A | in a W pot | 1950 | 2 | N$_2$ | C furnace oven | 2100 | 24 | N$_2$ |
| 9 | | A | in a W pot | 1950 | 2 | N$_2$ | C furnace oven | 2100 | 40 | N$_2$ |
| 10 | | A | in a W pot | 1950 | 2 | N$_2$ | C furnace oven | 2100 | 60 | N$_2$ |
| 11 | | A | in a W pot | 1950 | 2 | N$_2$ | C furnace oven | 2170 | 50 | N$_2$ |
| 12 | 530 | 30 | in an AlN pot | 1900 | 2 | N$_2$ | C furnace oven | 1980 | 8 | N$_2$ |
| *13 | 1210 | 160 | in an AlN pot | 1850 | 2 | N$_2$ | C furnace oven | 2050 | 20 | N$_2$ |
| *14 | 2680 | 30 | in an AlN pot | 1850 | 2 | N$_2$ | C furnace oven | 2000 | 1 | N$_2$ |
| 15 | 300 | 110 | in a W pot | 2000 | 2 | N$_2$ | C furnace oven | 1900 | 8 | N$_2$ |
| *16 | 570 | 190 | in a W pot | 2050 | 2 | N$_2$ | C furnace oven | 2000 | 20 | N$_2$ |
| *17 | 770 | 360 | in a W pot | 2050 | 2 | N$_2$ | C furnace oven | 2050 | 12 | N$_2$ |

*: A mark * indicates those which lie outside the scope of the invention.

TABLE 3

| Sample No. | AlN starting material (ppm) | Baking | | | | Heat-treatment | | | |
|---|---|---|---|---|---|---|---|---|---|
| | | Setting method | Temp. (°C.) | Time (hr) | Atmosphere | Setting method | Temp. (°C.) | Time (hr) | Atmosphere |
| 18 | B | in a W pot | 2000 | 2 | $N_2$ | C furnace | 1950 | 12 | $N_2$ |
| 19 | C | in a W pot | 2000 | 2 | $N_2$ | C furnace | 2000 | 3 | $N_2$ |
| 20 | D | in a W pot | 2000 | 2 | $N_2$ | C furnace | 2000 | 8 | $N_2$ |
| 21 | D | in a W pot | 2000 | 2 | $N_2$ | C furnace | 2150 | 2 | $N_2$ |
| *22 | E | in a W pot | 2000 | 2 | $N_2$ | W furnace | 2050 | 3 | $N_2$ + CO |
| 23 | E | in a W pot | 2000 | 2 | $N_2$ | C furnace | 2000 | 25 | $N_2$ + CO |
| *24 | F | in a W pot | 2000 | 2 | $N_2$ | C furnace | 2000 | 1 | $N_2$ |
| *25 | G | in a W pot | 2000 | 2 | $N_2$ | C furnace | 2050 | 3 | $N_2$ |
| *26 | H | in a W pot | 2000 | 2 | $N_2$ | C furnace | 2000 | 8 | $N_2$ |

*: A mark * indicates those which lie outside the scope of the invention.

The obtained sintered products were measured for their average grain sizes of aluminum nitride by an electron microphotograph and were further measured for their oxygen amount and carbon amount by the combustion analysis and measured for their cationic impurity amounts by the ICP emission spectroanalysis. The sintered products were further measured for their bulk density and porosity by the Archimedes' method.

The obtained sintered products were cut into transverse test prices (3×4×38 mm) in compliance with JIS R1601 and were measured for their deformation rate by the three-point bending method while applying stress of 10 kg/cm² at a temperature of 1823 K. The results were as shown in Tables 4 and 5. FIG. 1 shows a relationship between the logarithmic values (log D) of average grain sizes D of aluminum nitride and logarithmic values (log ε) of creep rates which are based on the results.

From Tables 1 to 5, the samples Nos. 1 and 2 baked in a non-oxidizing atmosphere without containing carbon exhibited small average grain sizes and large creep rates since impurity components had not been sufficiently removed. Further, the samples Nos. 13, 14 16 and 17 that contained Si and Fe in large amounts in the starting materials and that contained Si and Fe in the sintered products in amounts greater than the ranges of the present invention, exhibited large creep rates and poor durability at high temperatures.

The sample No. 22 that was heat-treated in an atmosphere without containing carbon did not exhibit good properties since impurities had not been sufficiently removed and particles did not grow satisfactorily. In the case of the samples Nos. 24, 25 and 26 using aluminum nitride starting materials F, G and H containing excess amounts of impurities, the impurities could not be removed by the baking method and heat treatment of the present invention or could not be removed requiring very long periods of time. The sintered products obtained therefrom did not exhibit good properties.

TABLE 4

| Sample No. | Average grain size (μm) | $O_2$ amount (wt %) | C amount (wt %) | Amount of cationic impurities (ppm) | | | | Bulk density (g/cm³) | Open porosity (%) | Transverse strength at 1823K (kg/mm²) | Creep rate (1/sec) |
|---|---|---|---|---|---|---|---|---|---|---|---|
| | | | | Si | Fe | Ca | Total | | | | |
| *1 | 3.3 | 1.12 | 240 | 190 | 16 | 210 | 459 | 3.219 | 1.41 | 23 | $3.16 \times 10^{-6}$ |
| *2 | 6.8 | 2.06 | 220 | 660 | 30 | 110 | 898 | 3.179 | 2.45 | 21 | $4.17 \times 10^{-8}$ |
| 3 | 9.3 | 1.00 | 200 | 220 | 24 | 130 | 406 | 3.239 | 0.37 | 23 | $1.67 \times 10^{-8}$ |
| 4 | 11.1 | 0.89 | 220 | 290 | 12 | 100 | 420 | 3.218 | 0.24 | 19 | $3.59 \times 10^{-9}$ |
| 5 | 13.2 | 0.75 | 310 | 220 | 13 | 60 | 312 | 3.248 | 0.21 | 20 | $1.38 \times 10^{-9}$ |
| 6 | 20.9 | 0.78 | 260 | 270 | 14 | 40 | 362 | 3.242 | 0.21 | 16 | $9.55 \times 10^{-11}$ |
| 7 | 24.8 | 0.88 | 230 | 180 | 70 | 20 | 293 | 3.255 | 0.12 | 17 | $2.87 \times 10^{-11}$ |
| 8 | 30.8 | 0.81 | 240 | 140 | 16 | 10 | 198 | 3.249 | 0.15 | 14 | $<1 \times 10^{-11}$ |
| 9 | 41.2 | 0.80 | 250 | 130 | 19 | 10 | 318 | 3.249 | 0.13 | 12 | $<1 \times 10^{-11}$ |
| 10 | 46.4 | 0.85 | 210 | 130 | 36 | 10 | 232 | 3.251 | 0.16 | 11 | $<1 \times 10^{-11}$ |
| 11 | 50.7 | 0.75 | 210 | 150 | 24 | 10 | 219 | 3.253 | 0.11 | 10 | $<1 \times 10^{-11}$ |
| 12 | 16.7 | 1.01 | 270 | 490 | 20 | 60 | 607 | 3.234 | 0.18 | 17 | $5.60 \times 10^{-10}$ |
| *13 | 25.6 | 0.91 | 200 | 1040 | 120 | 30 | 1183 | 3.247 | 0.15 | 16 | $2.45 \times 10^{-8}$ |
| *14 | 12.1 | 0.96 | 260 | 2420 | 20 | 90 | 2613 | 3.249 | 0.09 | 19 | $1.07 \times 10^{-7}$ |
| 15 | 10.5 | 0.90 | 270 | 280 | 100 | 100 | 538 | 3.240 | 0.12 | 20 | $9.44 \times 10^{-9}$ |
| *16 | 21.3 | 0.83 | 250 | 480 | 160 | 30 | 690 | 3.255 | 0.10 | 16 | $2.61 \times 10^{-8}$ |
| *17 | 26.7 | 0.76 | 260 | 670 | 310 | 30 | 1031 | 3.243 | 0.14 | 16 | $2.24 \times 10^{-8}$ |

A mark * indicates those which lie outside the scope of the invention.

TABLE 5

| Sample No. | Average grain size (μm) | $O_2$ amount (wt %) | C amount (wt %) | Amount of cationic impurities (ppm) | | | | Bulk density (g/cm³) | Open porosity (%) | Transverse strength at 1823K (kg/mm²) | Creep rate (1/sec) |
|---|---|---|---|---|---|---|---|---|---|---|---|
| | | | | Si | Fe | Ca | Total | | | | |
| 18 | 13.6 | 0.68 | 240 | 26 | 5 | 23 | 89 | 3.234 | 0.23 | 19 | $6.73 \times 10^{-9}$ |
| 19 | 10.2 | 0.99 | 370 | 27 | 13 | 19 | 106 | 3.248 | 0.21 | 20 | $8.14 \times 10^{-9}$ |
| 20 | 12.6 | 0.97 | 310 | 38 | 23 | 11 | 128 | 3.252 | 0.08 | 20 | $3.53 \times 10^{-9}$ |
| 21 | 15.7 | 0.87 | 230 | 19 | 13 | 8 | 83 | 3.250 | 0.14 | 18 | $8.06 \times 10^{-9}$ |
| *22 | 5.9 | 1.44 | 230 | 11 | 9 | 15 | 103 | 3.241 | 0.22 | 22 | $7.69 \times 10^{-7}$ |
| 23 | 22.6 | 1.49 | 340 | 26 | 26 | 108 | 231 | 3.242 | 0.12 | 17 | $8.61 \times 10^{-11}$ |
| *24 | 5.0 | 1.41 | 430 | 36 | 29 | 11 | 114 | 2.925 | 9.37 | 9 | not mesurable |
| *25 | 10.6 | 1.70 | 290 | 340 | 1200 | 46 | 1170 | 3.230 | 0.42 | 19 | $3.14 \times 10^{-8}$ |
| *26 | 9.6 | 3.33 | 280 | 27 | 19 | 9 | 109 | 3.219 | 1.53 | 16 | $1.85 \times 10^{-6}$ |

A mark * indicates those which lie outside the scope of the invention.

On the other hand, the samples of the present invention all exhibited excellent anti-creeping properties at high temperatures in contrast with the above comparative examples. Referring to FIG. 1, the creep rate decreases with an increase in the average crystalline particle diameter. The transverse strength, however, tends to become small if the average grain size becomes too great. Therefore, the transverse strength at 1823 K of greater than 15 kg/mm² was accomplished with the average grain size of smaller than 40 μm.

Example 2

A powder of aluminum nitride (the starting material B of Table 1) and an organic binder were mixed together in a ball mill to prepare a slurry which was then granulated by the spray-drying method. The obtained granules were introduced into a mold and was press-molded into a size measuring 200×200×7 mm. The molded articles were dewaxed in the air at a temperature of 550° C. The dewaxed articles were contained in a tungsten pot and were baked in a nitrogen atmosphere at temperatures shown in Table 6 for two hours. The articles were further baked in a furnace in which a heater is made of graphite at 2150° C. for 10 hours to obtain sintered products (samples Nos. 1 to 4) having different relative densities. In these sintered products, the amounts of cationic impurities except aluminum were all smaller then 0.2% by weight, the amount of Si was smaller than 50 ppm, the amount of Fe was smaller than 10 ppm, and the amount of Ca was smaller than 150 ppm.

Thereafter, the sintered products were polished such that the surface coarseness (Rmax) was smaller than 6 μm to prepare setters and support members shown in FIG. 3. The sintered products were measured for their properties, i.e., relative densities, average grain sizes, oxygen amounts, carbon amounts and creep rates in the same manner as in Example 1. The results were as shown in Table 6.

Next, the aluminum nitride substrates were prepared using the above baking jigs. First, to the powder of aluminum nitride were added $Y_2O_3$ in an amount of 2% by weight and an organic binder in a predetermined amount, and the mixture was granulated to prepare granules from which a first molded article of substrate (hereinafter referred to as "first molded article") was prepared measuring 35×35×1.3 mm.

Then, the first molded article was placed on the baking jig such as setters, dewaxed in the air at 550° C., and was then baked at 1700° to 1800° C. in a nitrogen atmosphere. Using the same jig, it was used ten times in the above treatment. The jigs were then observed for their deformation, seizure of the jigs, change in the surface coarseness of the jigs, and migration of sintering assistant from the molded article of substrate. The jigs and AlN substrates were further observed for their seizure, stains and warping of the AlN substrates. The AlN substrates were measured for their heat conductivity by the laser flash method. The results were as shown in Table 6. Furthermore, dielectric losses (tan δ) at 1 MHz were measured as electric properties. The AlN substrates all exhibited dielectric losses of smaller than $1\times10^{-4}$.

According to Table 6, the sintered product exhibits a large creep rate when the baking jig has a relative density which is smaller than 90% (jig No. 4); i.e., the baking jig is deformed and the surfaces thereof are coarsened. Furthermore, the sintering assistant in the molded article of substrate migrates into the baking jigs. Therefore, the baking jig and the molded article of substrate partly react with each other causing the AlN substrate to be stained. When the baking jigs possessed a relative density of greater than 90%, on the other hand, the baking jigs all exhibited excellent durability and none of the obtained AlN substrates exhibited stain or warping.

Example 3

Baking jigs were prepared in the same manner as in the aforementioned Example 2. In preparing the baking jigs, however, the dewaxing temperature was changed in nitrogen over a range of from 200° to 850° C., and then the articles were baked in a tungsten pot in a nitrogen atmosphere ar 1940° C. for three hours and were baked for another 10 hours in a furnace in which a heater is made of graphite at 2150° C. in order to obtain seven kinds of sintered products containing residual carbon in different amounts as shown in Table 7. Using these sintered products, the baking jigs (jig Nos. 5 to 11) were prepared in the same manner as in Example 2. The baking jigs were evaluated for their properties in the same manner as in Example 2. The results were as shown in Table 7. The obtained sintered products all possessed a relative density of greater than 95%, an average grain size of 15 to 35 μm, an oxygen amount of smaller than 0.7% by weight, amounts of cationic impurities of smaller than 0.2% by weight, an Si amount of smaller than 50 ppm, an Fe amount of smaller than 10 ppm and a Ca amount of smaller than 150 ppm.

On the baking jigs were placed second molded articles of substrates (hereinafter referred to as "second molded plates") measuring 35×35×1.3 mm comprising a mixture powder of aluminum nitride containing 7.5% by weight of $Er_2O_3$ and 0.1% by weight of CaO, which were then baked at 1720° C. in a nitrogen atmosphere in order to obtain AlN substrates.

The baking jigs and the AlN substrates were evaluated for their properties in the same manner as in Example 2. The results were as shown in Table 7.

TABLE 6

| Jig No. | Baking temp. (°C.) | Relative density (%) | Average grain size (μm) | C amount (wt %) | O₂ amount (wt %) | Creep rate (l/sec) | Condition of baking jig after used | Condition of AlN substrate | Heat conductivity of AlN substrate (W/mk) |
|---|---|---|---|---|---|---|---|---|---|
| 1 | 1800 | 91.4 | 18 | 0.09 | 1.39 | $1.90 \times 10^{-8}$ | good | good | 170 |
| 2 | 1850 | 96.1 | 25 | 0.03 | 1.26 | $8.13 \times 10^{-9}$ | good | good | 177 |
| 3 | 1950 | 99.8 | 34 | 0.02 | 1.37 | $<1 \times 10^{-11}$ | good | good | 173 |
| *4 | 1750 | 88.3 | 17 | 0.04 | 1.45 | $3.07 \times 10^{-7}$ | deformed, surface carsened | deformed | 172 |

A mark * indicates the one that lies outside the scope of the invention.

TABLE 7

| Jig No. | Dewaxing temp. (°C.) | Carbon amount (wt %) | Creep rate (l/sec) | Condition of baking jig after used | Condition of AlN substrate | Dielectric loss at 1 MHz ($\times 10^{-4}$) |
| --- | --- | --- | --- | --- | --- | --- |
| 5 | 850 | 0.005 | $1 \times 10^{-11}$ | good | good | 1 or less |
| 6 | 750 | 0.02 | $1 \times 10^{-11}$ | good | good | 1 or les |
| 7 | 650 | 0.06 | $1 \times 10^{-11}$ | good | good | 1 or les |
| 8 | 550 | 0.15 | $1.94 \times 10^{-10}$ | good | good | 1 or less |
| 9 | 400 | 0.29 | $3.03 \times 10^{-9}$ | good | good | 13 |
| *10 | 250 | 0.48 | $9.44 \times 10^{-8}$ | deformed, seized, surface coarsened | stained | 89 |
| *11 | 200 | 0.63 | $6.16 \times 10^{-7}$ | deformed, seized, surface coarsened | stained | 1200 |

A mark * indicates those which lie outside the scope of the invention.

According to Table 7, the sintered products containing carbon in amounts greater than 0.3% by weight exhibit large creep rates at high temperatures and jigs made of these sintered products are deformed. Moreover, the obtained AlN substrates developed stains, exhibited tan δ of greater than $89 \times 10^{-4}$ at 1 MHz, and could not be used as substrates for semiconductor products. When the amount of carbon was smaller than 0.3% by weight, on the other hand, the baking jigs deformed little at high temperature and the AlN substrates were not affected.

It was experimentally confirmed that abnormal dielectric loss tan δ developed when a substance containing carbon in an amount greater than 0.3% by weight existed near the molded article of AlN substrate. When the baking jigs contained carbon in an amount greater than 0.3% by weight, the baking jigs seized up together, or the baking jigs and the AlN substrate seized up together, the baking jigs underwent deformation, and the AlN substrates developed stains. The above defects, however, did not develop with the samples Nos. 5 to 9 that contained carbon in amounts smaller than 0.3% by weight. After used 100 times, the surface coarseness of the baking jigs was Rmax 6 μm when the amounts of carbon were smaller than 0.3% by weight and was little different from that of before being used. In the case of the sample No. 11 containing carbon in an amount greater than 0.3% by weight, however, the surface coarseness was greater than 15 μm.

Example 4

Powders of various high-purity aluminum nitride having average grain sizes of 1 to 3 μm, and containing cationic metal impurities in amounts smaller than 0.1% by weight and oxygen in amounts of 0.5 to 7% by weight, and an organic binder were mixed together. The mixtures were press-molded into a size measuring 200×200×7 mm, dewaxed in the air at 550° C., baked in a tungsten pot in a nitrogen atmosphere at a temperature of 1920° to 2000° C. for three hours, and were further heat-treated in a furnace in which the heater is made of graphite in a nitrogen atmosphere at 2050° C. for 24 hours, in order to obtain sintered products containing oxygen in various amounts as shown in Table 8. The sintered products were evaluated for their properties in the same manner as in Example 2 and were all found to have a relative density of greater than 95%, an average grain size of 13 to 30 μm, carbon in an amount of smaller than 300 ppm, cationic impurities in amounts smaller than 0.1% by weight, Si in an amount smaller than 600 ppm, Fe in an amount smaller than 150 ppm and Ca in an amount smaller than 200 ppm. The surfaces of the obtained sintered products were polished to Rmax 6 μm or smaller to prepare baking jigs (jig Nos. 12 to 18).

The same molded articles as the first molded article used in Example 2 were placed on the baking jigs, dewaxed in the air at 550° C., and were sintered at 1790° C. in nitrogen to obtain AlN substrates. The baking jigs and the AlN substrates were evaluated for their properties in the same manner as in Example 2. The results were as shown in Table 8.

TABLE 8

| Jig No. | Oxygen amount (wt %) | Creep rate (l/sec) | Condition of baking jig after used | Condition of AlN substrate | Thermal conductivity of AlN substrate (W/mk) |
| --- | --- | --- | --- | --- | --- |
| 12 | 0.44 | $4.62 \times 10^{-10}$ | good | good | 180 |
| 13 | 0.88 | $3.75 \times 10^{-11}$ | good | good | 180 |
| 14 | 2.87 | $4.19 \times 10^{-9}$ | good | good | 176 |
| 15 | 3.00 | $9.32 \times 10^{-9}$ | good | good | 169 |
| 16 | 4.79 | $1.78 \times 10^{-8}$ | good | good | 169 |
| *17 | 5.46 | $5.81 \times 10^{-7}$ | deformed, seized | stained, deformed | 138 |
| *18 | 6.02 | $1.13 \times 10^{-6}$ | deformed, seized | stained, deformed | 113 |

A mark * indicates those which lie outside the scope of the invention.

From the above experimental results, it was found that the samples Nos. 12 to 16 containing oxygen in amounts smaller than 5% by weight exhibited small creep rates, and the obtained AlN substrates exhibited heat conductivities of 169 to 180 W/mk and no problem is aroused. However, the jigs Nos. 17 and 18 containing oxygen in amounts greater than 5% by weight were deformed after used repetitively, and the obtained AlN substrates exhibited the heat conductivity of smaller than 140 W/mk.

Example 5

The starting material E of Table 1 used in Example 1 was mixed with a $CaCO_3$ powder or a $Y_2O_3$ powder as a sintering assistant, and from which molded articles were prepared in the same manner as in Example 2. The molded articles were contained in the tungsten port, and were baked in a nitrogen atmosphere at 1730° to 1980° C. to obtain highly dense sintered products. Thereafter, the sintered products were heat-treated in a furnace in which the heater is made of graphite at 2000° C. for 0.5 to 50 hours to volatilize part of the metal components in the sintered products. There were obtained sintered products containing Ca and Y in amounts as shown in Table 9. Properties of the sintered products were measured in the same manner as in Example 2. The results were as shown in Table 9. The obtained sintered products were polished to Rmax 6 μm or smaller to obtain baking jigs (jig Nos. 19 to 26).

On the baking jigs were placed molded articles of AlN substrates containing $Yb_2O_3$ in an amount of 5% by weight as a sintering assistant and measuring 35×35×1.3 mm, which were then dewaxed in the air at 550° C. and were further baked at 1790° C. in nitrogen. The obtained AlN substrates and the jigs after baked were evaluated in the same manner as in Example 2. The results were as

TABLE 9

| Jig No. | Composition of sintered product (ppm) | | | Creep rate (l/sec) | Condition of baking jig after used | Condition of AlN substrate |
|---|---|---|---|---|---|---|
| | Ca amount | Y amount | Amount of cationic metals other than Al | | | |
| 19 | 50 | 10 | 100 | $4.47 \times 10^{-10}$ | good | good |
| 20 | 150 | 10 | 100 | $8.05 \times 10^{-9}$ | good | good |
| *21 | 230 | 10 | 100 | $3.11 \times 10^{-7}$ | deformed | deformed, sintered |
| *22 | 300 | 10 | 100 | $4.67 \times 10^{-7}$ | deformed | deformed, sintered |
| 23 | 20 | 120 | 280 | $9.14 \times 10^{-9}$ | good | good |
| 24 | 20 | 300 | 2100 | $1.02 \times 10^{-8}$ | good | good |
| *25 | 20 | 500 | 3200 | $2.08 \times 10^{-6}$ | deformed | deformed, sintered |
| *26 | 20 | 1000 | 4100 | $1.89 \times 10^{-5}$ | deformed | deformed, sintered |

A mark * indicates those which lie outside the scope of the invention.

shown in Table 9.

From the above experimental results, it was found that the jig Nos. 21, 22 containing Ca in amounts in excess of 200 ppm and the jig Nos. 25, 26 containing cationic metal impurities in amounts in excess of 0.3% by weight all exhibited large creep rates and were deformed after used repetitively.

On the other hand, the jigs Nos. 19, 20, 23 and 24 containing Ca in amounts smaller than 200 ppm and cationic impurities other than Al in amounts smaller than 0.3% by weight, all exhibited small creep rates, were not deformed, and exhibited excellent durability.

According to the present invention as described above, the average grain size of the aluminum nitride and the amounts of impurity components are controlled to lie within predetermined ranges, in order to obtain sintered products that exhibit excellent anti-creeping property at high temperatures and that do not almost undergo deformation even under the condition where stress is added thereto at high temperatures for extended periods of time.

Therefore, the sintered products can be used as a variety of structural materials for high temperature applications. Concretely speaking, when the sintered materials are used as baking jig such as setters, the jigs do not undergo deformation, do not lose purity or are not seized up together even after used repetitively. Moreover, the jigs do not cause seizure or reaction to the molded article being baked and do not give any adverse effects. Therefore, the ceramics can be baked at reduced costs contributing greatly to improving produceability by baking and rationalizing the manufacturing steps.

What is claimed is

1. A sintered product of aluminum nitride which has been sintered without addition of a sintering assistant, consisting essentially of a single phase of aluminum nitride, having an average grain size of greater than 9 μm, cationic metal impurities other than aluminum in a total amount smaller than 0.3% by weight, Si in an amount smaller than 1000 ppm, Fe in an amount smaller than 150 ppm, and Ca in an amount smaller than 200 ppm, and carbon in an amount smaller than 0.3% by weight, and having a relative density of greater than 90%, wherein when a transverse test piece prepared therefrom in compliance with JIS R1601 is subjected to the application of stress under the conditions of 1823 K and 10kg/mm$^2$, a creep rate of smaller than $2 \times 10^{-8}$/sec is exhibited.

2. A sintered product of aluminum nitride according to claim 1, wherein the content of oxygen is smaller than 5% by weight.

3. A process for preparing sintered products of aluminum nitride wherein a molded article consisting essentially of an aluminum nitride powder having cationic metal impurities other than aluminum in a total amount smaller than 0.3% by weight, Si in an amount smaller than 1000 ppm, Fe in an amount smaller than 150 ppm, and Ca in an amount smaller than 200 ppm, is baked at a temperature higher than 1800° C. in a nonoxidizing atmosphere substantially free of carbon to increase the density thereof and is further heat-treated at a temperature of 1850° to 2200° C. in an atmosphere containing carbon, wherein at the time the molded article is baked, the aluminum nitride powder is free of any sintering assistant.

4. A baking jig made of a sintered product of aluminum nitride which has been sintered without addition of a sintering assistant, consisting essentially of a phase of aluminum nitride, having an average grain size of greater than 9 μm, cationic metal impurities other than aluminum in a total amount smaller than 0.3% by weight, carbon in an amount smaller than 0.3% by weight, oxygen in an amount smaller than 5% by weight, and having a relative density of greater than 90%, wherein when a transverse test piece prepared therefrom in compliance with JIS R1601 is subjected to the application of stress under the conditions of 1823 K and 10 kg/mm$^2$, a creep rate of smaller than $2 \times 10^{-8}$/sec is exhibited.

* * * * *